H. BIENUTTA, G. FISCHBACH & C. ZIGAHN.
HEAT INSULATED COOKER.
APPLICATION FILED APR. 18, 1911.
1,041,581.  Patented Oct. 15, 1912.
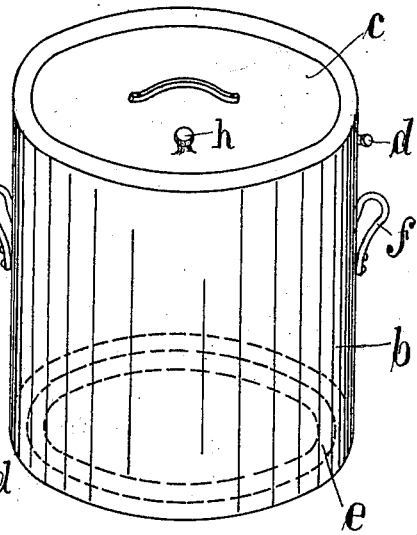
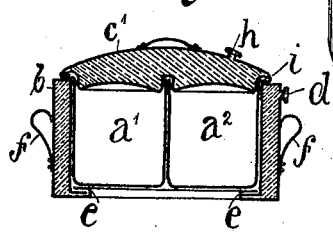
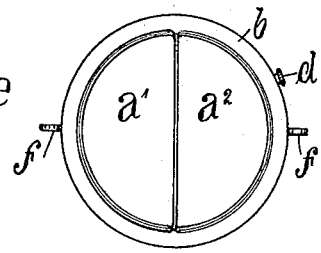
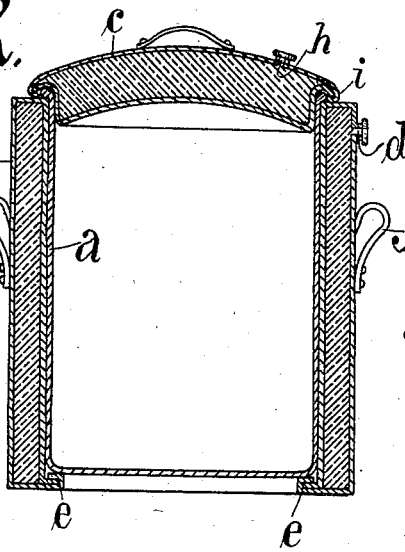
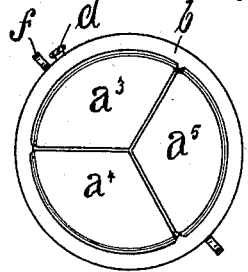
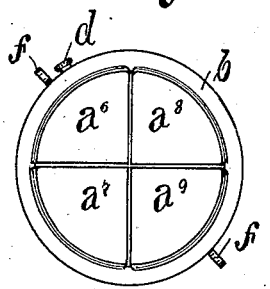
Witnesses.
Inventors:

UNITED STATES PATENT OFFICE.

HANS BIENUTTA, GUSTAV FISCHBACH, AND CARL ZIGAHN, OF LYCK, GERMANY.

HEAT-INSULATED COOKER.

1,041,581.  Specification of Letters Patent.  Patented Oct. 15, 1912.

Application filed April 18, 1911. Serial No. 621,961.

*To all whom it may concern:*

Be it known that we, HANS BIENUTTA, GUSTAV FISCHBACH, and CARL ZIGAHN, subjects of the German Emperor, and residing at Lyck, East Prussia, Germany, have invented certain new and useful Improvements in Heat-Insulated Cookers, of which the following is a specification.

Our invention relates to a cooker made in such manner that when it has been taken from the fire, after the food contained in it has been boiled on the fire, the food in it continues to boil.

Our improved cooker comprises a receptacle for containing the food, a double-walled vessel having insulation between its walls and a projecting edge carrying the receptacle, the top of the receptacle and the outer vessel being tightly closed by a hollow lid filled with insulation pressed firmly on the same.

Some illustrative embodiments of our invention are represented by way of example in the accompanying drawing, wherein:—

Figure 1 is a perspective view and Fig. 2 a vertical section showing one form of our cooker; Fig. 3 shows another form of our cooker in vertical section, on a smaller scale, comprising two pots in an outer casing, and Fig. 4 is a plan of the latter form after the lid has been removed; Fig. 5 is a plan of another form of our cooker comprising three pots, the lid having been removed, and Fig. 6 is a like view of another form comprising four pots.

Referring firstly to Figs. 1 and 2, our cooker comprises three parts:—the pot proper $a$ for the food, the outer casing $b$ containing the pot $a$ and covered by the lid $c$. The pot $a$ is preferably stamped in one piece out of suitable material, e. g., sheet iron, and subsequently enameled. The casing $b$ has double walls and, with the exception of a hole $d$ preferably closed by a screw or cap, is completely closed. Between its walls is insulation consisting of bad conductors of heat, e. g. silica, either alone or mixed with powdered cork, mica or asbestos. We preferably make the casing $b$ of tinned sheet metal or sheet iron. The lower edges of its two walls are folded together so that an inwardly projecting fold or ledge $e$ is made on which the pot $a$ rests, so that the latter cannot fall through the outer casing $b$. Handles $f$ are attached to the casing $b$. The lid $c$ is also made with two walls and is filled with insulation. The lid is completely closed with the exception of a hole $h$ preferably closed by a screw or cap. The upper edge $i$ is formed by folding the edges of the two walls of the lid together to form a projecting rim which rests in such manner on the top edge of the casing $b$ that a tight closure is obtained between the lid and the projecting upper edges of the pot $a$ on the one hand and between the lid and the casing $b$ on the other hand.

Our cooker is used as follows:—After food has been put into the pot $a$ and the latter has been placed into the casing $b$, the cooker is placed on the fire, and after the food has been raised to the boiling point, it is allowed to boil for five to twenty minutes longer according to the nature of the food. The lid is then placed firmly on the pot, and the entire pot is taken from the fire and placed on a plate of asbestos, felt or the like. Owing to the casing $b$ having been exposed to the fire and to the insulation having become hot and to the latter remaining hot for a long time, the food continues to boil after being removed from the fire without there being any fear of its being burned.

By using our improved cooker not only is fuel saved, but also time, because the food boils further automatically, so that the cook can be occupied with other matters during this time. It is not necessary to cover the cooker with cloths or the like in order to retain the heat in it. The preparation of food in our cooker has the additional advantage that, e. g., in the case of soups and gravies, after the pot has been removed from the fire, the contents are not diminished, so that subsequent pouring in of water, milk, cream and the like which would dilute the food and take the strength from it, is not necessary.

Referring now to Figs. 3 to 6, instead of one pot $a$, two of them $a^1$, $a^2$ or three of them $a^3$, $a^4$, $a^5$ or more may be provided in the outer basing $b$. The individual pots $a^1$, $a^2$ ... are of such a shape that in each case their total section fills up the inside section of the vessel $b$, as clearly shown. The employment of a plurality of pots in one outer casing enables various foods to be prepared simultaneously, for example, the various courses of a meal, such as soup, fish, vegetables, roast meat or the like. Therefore, not only are vessels saved, but firing also because the individual pots $a^1$, $a^2$ ... are exposed to the full action of the fire just as the single pot. As Fig. 3 shows, at the places where the walls of the individual pots abut against one another the lid $c^1$ is preferably provided with recesses or grooves into which the walls can enter.

We claim:—

1. A cooker, comprising in combination, a double-walled annular outer casing having an inwardly-projecting ledge at the inner bottom edge thereof and containing insulation between its walls, a pot for containing food resting on the ledge in the casing, and a lid having double walls and filled with insulation tightly closing the top of both the pot and the outer casing, the upper outer edge of the lid being formed by folding the edges of the two walls together.

2. A cooker, comprising in combination, a double-walled annular outer casing having an inwardly-projecting ledge at the inner bottom edge thereof and containing insulation between its walls, a plurality of pots for containing food resting on the ledge in the casing, the total section of the pots for containing food filling the inside section of the outer casing, and a lid having double walls and filled with insulation tightly closing the top of the pots and the outer casing, the upper outer edge of the lid being formed by folding the edges of the two walls together.

HANS BIENUTTA.
GUSTAV FISCHBACH.
CARL ZIGAHN.

Witnesses:
M. HANNKE,
F. FRIESE.

---

Copies of this patent may be obtained for five cents each, by addressing the "Commissioner of Patents, Washington, D. C."